Jan. 12, 1965  J. H. GRAY  3,164,940
COTTON SCRAPPER MEANS
Filed Dec. 13, 1962  3 Sheets-Sheet 1

INVENTOR,
JAMES H. GRAY
BY
Weatherford & Weatherford
Attys

Jan. 12, 1965 J. H. GRAY 3,164,940
COTTON SCRAPPER MEANS
Filed Dec. 13, 1962 3 Sheets-Sheet 2

INVENTOR,
JAMES H. GRAY
BY
Weatherford & Weatherford
Attys

Jan. 12, 1965   J. H. GRAY   3,164,940
COTTON SCRAPPER MEANS
Filed Dec. 13, 1962   3 Sheets-Sheet 3

INVENTOR,
JAMES H. GRAY
BY Weatherford & Weatherford
Attys

3,164,940
COTTON SCRAPPER MEANS
James H. Gray, Columbus, Miss., assignor to Tupelo Spindle Company, Inc., Columbus, Miss., a corporation of Mississippi
Filed Dec. 13, 1962, Ser. No. 244,480
32 Claims. (Cl. 56—28)

This invention relates to certain new and useful improvements in means, herein designated as cotton scrapper means, for salvaging scrap cotton which is that dropped upon the ground during harvesting, picking or otherwise, and would be lost except for such salvaging.

In the harvesting or picking of cotton, whether done by hand or by machine, there is a serious problem in the loss of part of the crop yield from locks or bolls of the cotton which are dropped upon the ground during such picking and are not delivered to the gin for processing into cotton bales. Many attempts have heretofore been made to provide means for retrieving or gleaning such lost or dropped locks of cotton from the ground, as well as for retrieving or harvesting other ground products. For the purpose of efficiently salvaging scrap cotton none of the prior devices has yet proven to be commercially efficient or economical in operation, and the present device is intended to provide a highly efficient means for effecting such salvaging of scrap cotton in an efficient and economical manner.

Furthermore, the present device contemplates the necessity for effecting cleaning of the cotton thus salvaged and provides for means for cleaning such salvaged cotton after it has been retrieved by the retrieving means of the device.

The present device contemplates the utilization along a cotton row of a machine which incorporates a bank of independent belts which are flexible and which are driven in a forwardly direction relative to the movement of the device as a whole. These belts are independently mounted at their forward and lower ends for independent vertical movement relative to ground contours which may be encountered, and each of the belts effectively provides a flexible belt upon which is mounted a plurality of overlapping flat comb-like grabber bars, which at their respective spines are rigidly fixed to the flexible belt and project along the belt overlapping the next succeeding bar of the series. The belt is designed to flex as it passes about its pulley support, and in so doing tangentially to project the respective grabber bars as they pass about the forward supporting pulley to separate the same and to provide for a better engagement of locks of cotton upon the ground over which the belt and grabber bars are passed. The device further provides improved means by which the pulleys at the forward ends of the respective belts are independently resiliently mounted, so as to maintain yielding ground contact during use.

The principal object of the present invention is to provide a new and novel cotton scrapper means for retrieving or gleaning scrap cotton.

A further object of the invention is to provide such a device in which the cotton scrapper means comprises a plurality of flexible belts arranged in a bank in parallelism, each of the belts being provided with a plurality of grabber bars arranged upon the belts, and each of the belts being disposed for independent vertical movement relative to contours of the ground when contacted.

A further object of the invention is to provide in such a device, grabber bars rigidly connected to a flexible belt in which each of the grabber bars comprises a spine attached to the belt and a plurality of leading prongs extending in the direction of movement of the belt.

A further object of the invention is to provide such a device in which a belt comprising a flexible belt portion and a plurality of grabber bars is trained about forward pulleys and a rearward drum for drive and operation.

A further object of the invention is to provide such a device in which each of the flexible belts comprises a belt portion and a plurality of grabber bars in which each of the grabber bars at its leading prong portion overlaps the next succeeding leading grabber bar.

A further object of the invention is to provide cotton scrapper means including belt-driven retrieving elements which comprise grabber bars that are separated during and by passage about the respective pulley and drum mounts so as to effectively grab and seize locks of cotton lying in the path of movement of such device.

A further object of the invention is to provide cotton scrapper means which comprises a plurality of flexible belts trained at their upward and rearward ends about a drum, and at their forward ends about the independent pulleys, with each of the pulleys being connected to a spring loaded strut pivotally carried by the frame of the device whereby to provide for independent vertical movement of the respective belts.

A further object of the invention is to provide cotton scrapper means comprising a plurality of flexible belts to each of which is mounted a multiplicity of grabber bars disposed in overlapping relationship and rigidly connected to the flexible belt projecting flatwise along the belt into overlapping relationship with the next succeeding leading grabber bar so that said grabber bars along the upper and lower flights of said belt are disposed in substantially flat and closely snug position, and as each of the belts passes about the respective rotational elements upon which the forward and rearward ends are carried the flatwise relationship of the grabber bars is separated so that the grabber bars respectively project tangentially from the belts and open a space for engaging and grasping locks of cotton lying in the path of the belt and grabber bars.

A further object of the invention is to provide such a device in which each of the independent forward pulleys mounting the respective belts is supported by a spring loaded strut which urges the pulley and the belt and grabber bars carried thereabout downwardly toward ground contact.

A further object of the invention is to provide such cotton scrapper means for retrieving locks of cotton in combination with cleaner means for removing trash from the retrieved cotton.

A further object of the invention is to provide such a device in which such cleaning means comprise doffing and beating means as well as saw means for effectively treating trash picked up with the retrieved cotton and disposing of same before delivery of such retrieved cotton to a container; and A further object of the invention is generally to improve the design, construction and efficiency of means for effecting retrieving and salvaging of scrap cotton.

The means by which the foregoing and other objects of the present invention are accomplished and the manner of their accomplishment will be readily understood from the following specification upon reference to the accompanying drawings, in which.

Figures 1, 2:
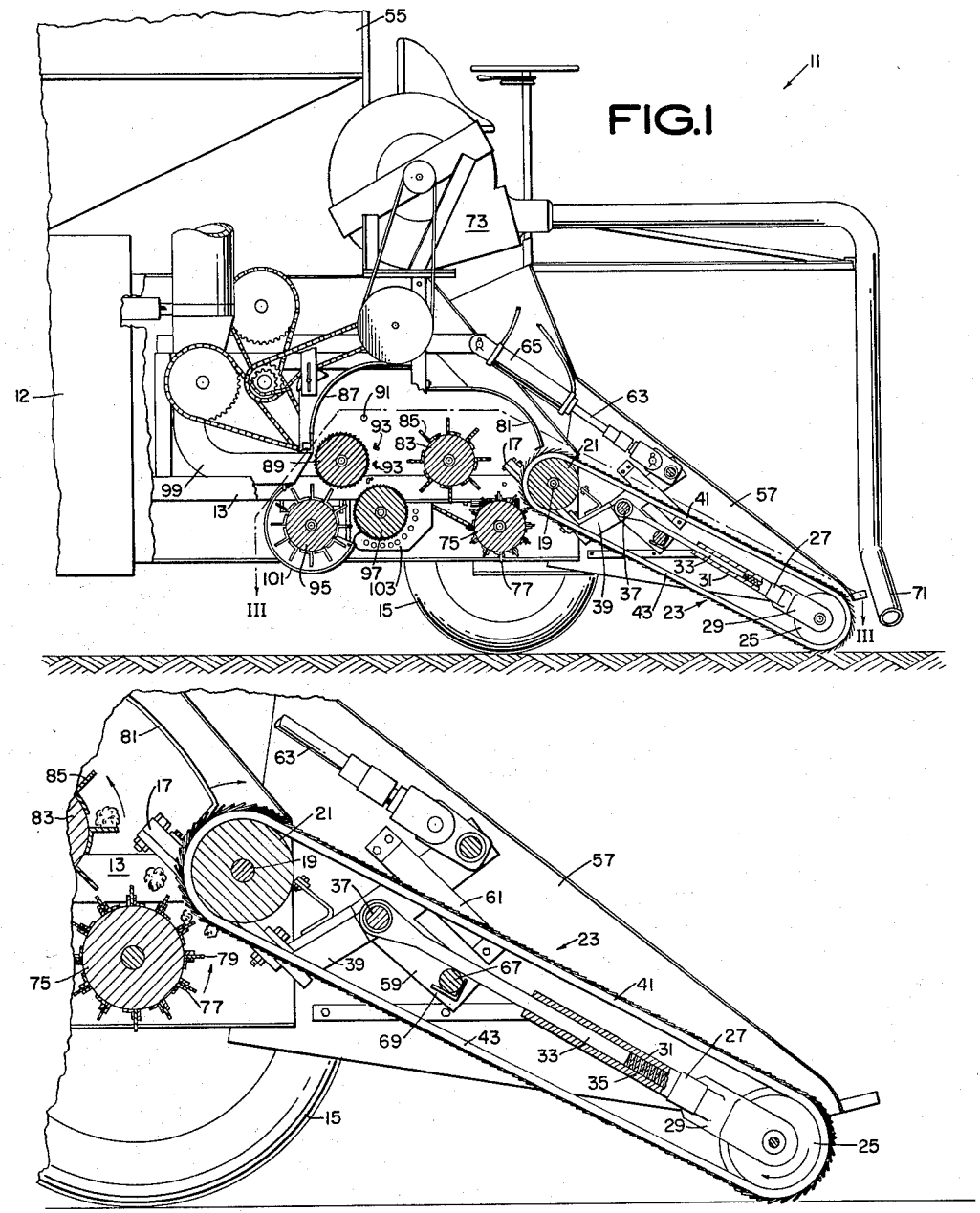
FIG. 1 is a fragmentary side elevational view, partly in section and partly in elevation, illustrating the present device.
FIG. 2 is a similar view on an enlarged scale specifically illustrating the cotton scrapper means.
Figure 3:
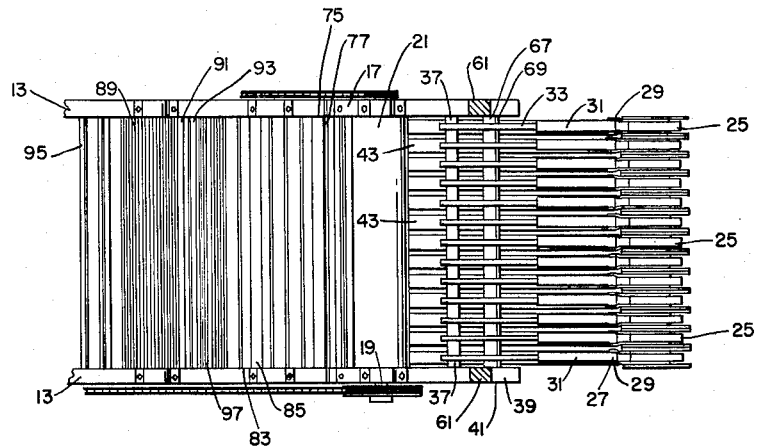
FIG. 3 is a fragmentary top plan view taken as on the line III—III of FIG. 1, and with parts removed for purposes of illustration.
Figure 7:
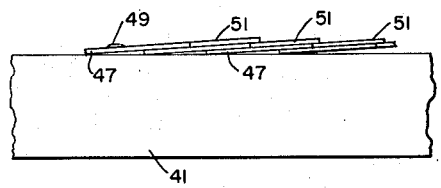
FIG. 7 is an edge view of the device as seen in FIG. 6.
Figure 8:
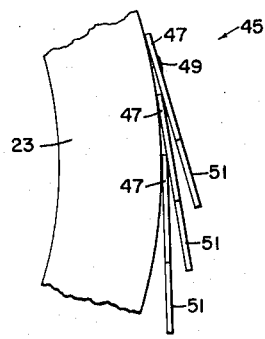
FIG. 8 is a similar edge view illustrating the disposition in passing around a pulley.
Figure 4:
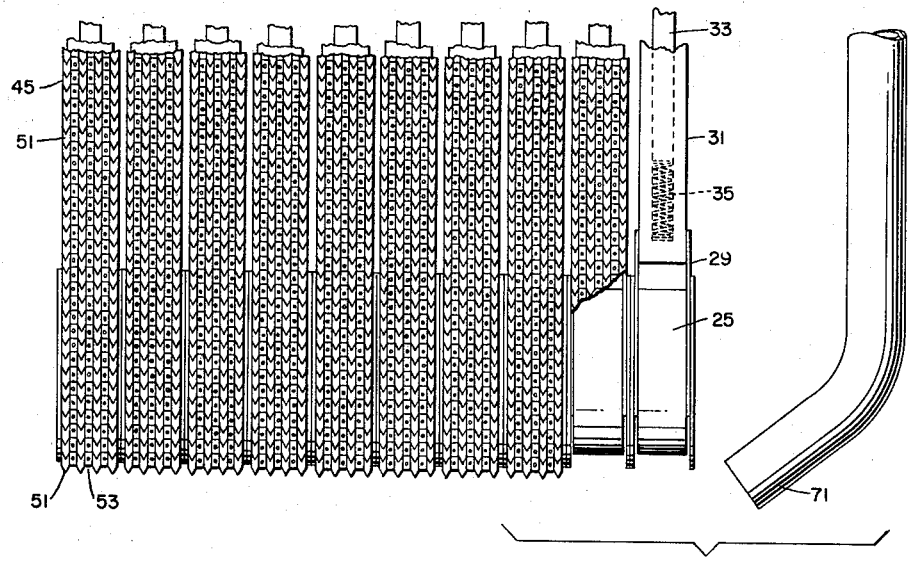
FIG. 4 is a fragmentary plan view of a portion of the bank of retriever belts of the cotton scrapper means, with parts broken away for illustration and other parts shown in dotted lines.
Figure 6:
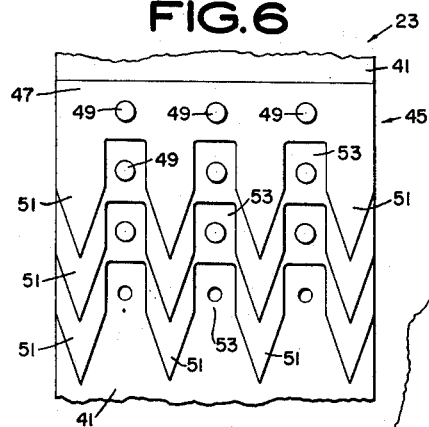
FIG. 6 is a further enlarged fragmentary view of a segment of one of the belts and grabber bars.
Figure 5:
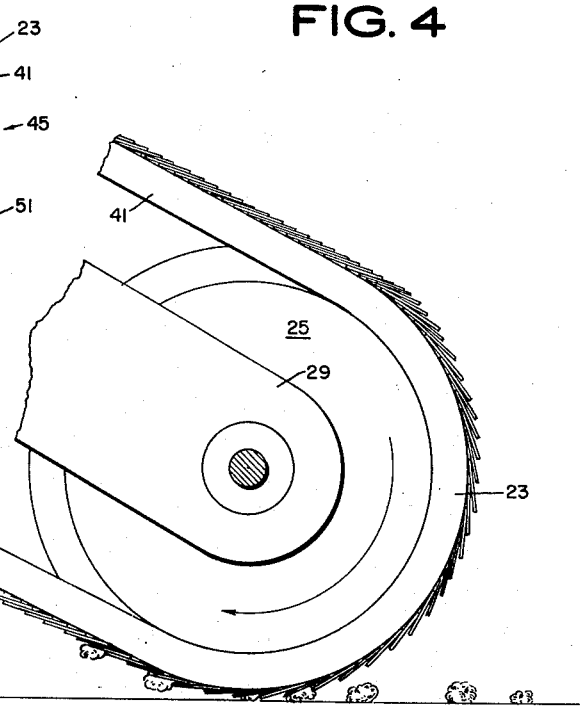
FIG. 5 is a further enlarged fragmentary view of the forward end of the bank of retriever belts illustrating the seizing of cotton locks by the grabber bars.

Referring now to the dawings in which the various parts are indicated by numerals, the present device comprises a scraper means 11, which is adapted for suitable attachment as to a tractor 12 for movement from place to place, and also is adapted for attachment to the power of such tractor in order to effect drive of the instrumentalities of scrapper means 11. Preferably the scrapper means 11 is connected to the tractor at the rear end of the scrapper means in order that the tractor may, in effect, push the scrapper means forwardly along the route to be followed.

Scrapper means 11 preferably comprises a substantially horizontal frame 13. Ground support for frame 13 and the instrumentalities carried and mounted thereupon is provided by wheels 15 suitably connected to the frame. Wheels 15 are disposed intermediate the length of frame 13, and when the frame 13 is coupled to a drive, such as a suitable tractor, provides support for the frame in its movement.

Scrapper means 11 comprise a forward retrieving section and a rearward cleaning and delivery section. The forward retrieving section is mounted to and projects forwardly from the forward end of frame 13. For this purpose a pair of brackets 17 are connected substantially at the forward end of frame 13. Mounted to the bracket 17 in suitable bearings is a shaft 19 upon which is carried a rotatable drum 21. Drum 21 extends from side to side of frame 13.

About drum 21 are trained a plurality of belts 23 which are disposed in side by side parallel relationship about the drum so as to provide a bank of belts, the drum providing support for the rearward part of the belts. At the forward end of the retrieving section a plurality of pulleys 25 are provided, with each of belts 23 being provided with and trained about one of pulleys 25, and with there being a number of pulleys 25 equal to the number of belts 23. Each of pulleys 25 is independently mounted for vertical movement at the forward end of the device by connection with a strut 27.

At the forward end of each strut 27 is included a clevis 29 which embraces its related pulley 25 and by which the pulley is journalled and is connected to the strut. Strut 27 comprises a pair of telescoping members including a forward tubular member 31, to the forward end of which clevis 29 is affixed, and a plunger member 33 which extends into the tubular member 31 at its forward portion and is housed therein. Interposed between the forward end of plunger 33 and the forward end of tubular member 31, is a compression spring 35 which urges extension of the strut and thus acts to extend the belts 23 between pulleys 25 and drum 21.

The upper end of each plunger 33 is connected to a pivot 37 which is carried by an arm 39 connected to and projecting from the lower and forward end of bracket 17. Pivot 37 extends from side to side of the device and is adapted to receive each of the plungers 33 of the respective struts 27 for the bank of belts 23. Pivot 37 is disposed somewhat above the pivot center of drum shaft 19 and above the center of the respective pulleys 25 so that the effect of the extension action of spring 35 is to exert not only a forward extension upon the strut, but also a downward movement upon the pulleys so as yieldingly to urge the pulleys and the belts carried thereby toward ground contact. Thus the bank of belts 23 is trained about drum 21 at the upper and rearward ends of the belts, and the respective belts are trained about pulleys 25 at the forward and lower ends of the belts, extending the belts in an elongate pattern providing for each belt an upper flight 41 and a lower flight 43. Drum 21 is driven from the main drive of the device so as to drive upper flights 41 of belts 23 forwardly and to drive the lower flights 43 rearwardly so that the upper flights are driven toward pulleys 25 in the general direction of travel of the device in use.

Each of belts 23 is substantially covered throughout its external extent by a plurality of grabber bars 45. Each grabber bar 45 includes a spine 47 adapted for rigid attachment to belt 23 as by rivets 49, spine 47 being of a width substantially coextensive with the width of belt 23. Projecting from spine 47 are a plurality of prongs 51 which are laterally spaced apart as at 53. Each of the prongs 51 is a tapering pointed element and projects away from the spine in a leading direction with respect to the direction of drive of the belt 23 to which the grabber bar is attached.

Grabber bars 45 are rigid flat plates and are firmly fixed to the respective belts 23. The grabber bars are affixed to the belts in such manner as to overlap and the plurality of grabber bars substantially covers the entire external service of the belt. Thus, as it will be seen, prongs 51 of a trailing grabber bar overlap substantially the spine 47 of the next succeeding leading grabber bar.

Along the upper and lower flights 41, 43 of belts 23 the grabber bars lie substantially flat in overlapping relationship, being angled from the belts 23 only by the thickness of the next succeeding grabber bar, and are held firmly in this position by the rigid attachment as through the rivets 49. As the belts are driven in operation of the device the grabber bars in passing about forward pulleys 25 are respectively tangentially separated away from the belt and the next preceding grabber bar in order to provide a gap between the grabber bars as they pass about the forward pulleys. This gap is adapted for the entry and engagement of locks and bolls of cotton on the ground, and the impaling or clamping engagement thereof by the grabber bars, and as the belts move further rearwardly the grabber bars which have engaged with locks of cotton are moved rearwardly and returned to their closely overlapping relationship with the next succeeding grabber bar, effecting an efficient clamping and grasping of the locks of cotton which have been engaged thereby. Further drive of the lower flights of the belts rearwardly toward and around drum 21 effects a similar opening or a gap between the grabber bars so as to release the locks of cotton which have been engaged thereby and to permit the discharge and handling thereof into a suitable container such as a basket 55.

As pointed out above, the prongs 51 of the respective grabber bars are substantially spaced apart. This enables the gravity discharge of a large amount of trash that might be picked up and carried otherwise by the device. Furthermore, in the event that the grabber bar should engage with a clod of dirt or the like, the clamping effect actuated by the return of the grabber bar to its overlapping relationship after passing beyond the forward pulley has a crushing effect upon such dirt clods and the particles of dirt are enabled to drop between the spaces in the grabber bars. It will be seen in the preferred embodiment that the prongs 51 are substantially spaced apart and that the width of space 53 is substantially equal to the width of the respective prongs, it being found that the relatively wide prongs separated by the equally wide spaces more efficiently performs the desired functions.

Thus the locks of cotton are delivered to the drum area in a substantially clean condition rid of much of the trash which might otherwise have accompanied the locks of cotton to that area. While this condition is true, some of the larger elements of trash, such as stalks and similar matter, are not so readily discharged in the simple manner just described, and in addition the locks of cotton having been resting on the ground have accumulated some dirt and trash among themselves and it is desirable to treat and clean the locks of cotton as they are discharged from the retrieving means in a suitable manner.

In order further to maintain the cotton retrieved by the retrieving means as substantially free of trash and other extraneous matter as it is being transported toward the drum, the sides of the retrieving means are enclosed in hoodlike fenders 57 which encase the edges of the bank of belts and of the related mechanisms and extend rearwardly to a position relatively overlying the drum 21. Toward the rearward portion of fenders 57, the fenders enlarge upwardly in order to accommodate and house therewithin the lifting mechanism by which the retrieving means may be lifted out of ground contact when it is desired to move the machine from one place to another when not in use.

Such lifting means comprises a rocker arm 59 pivoted at each end of pivot bar 37, the rocker arms 59 preferably being of substantially angular conformation, and at the upper ends of the rocker arms 59 a cross bar 61 is connected which spans from side to side of the retrieving means and above the bank of belts 23. To cross bar 61 is attached one end of the piston rod 63 of a hydraulic lift cylinder assembly 65. This cylinder assembly 65 is connected in usual manner to the hydraulic system of tractor 12 upon which the device is mounted in a manner which need not here be described as it is well known to those versed in the art.

Rocker arm 59 at its distal end carries a second cross bar 67, cross bar 67 being supported at its opposite ends from the rocker arms 59 as by brackets 69, and the cross bar 67 spans from side to side of the bank of belts comprising the retrieving unit. Cross bar 67 underlies the respective strut plungers 33 between pivot bar 37 and the upper ends of tubular strut members 31 so that when the rocker arm 59 is rocked through retracting actuation of lift cylinder assembly 65 a lifting force is exerted upon each of the plungers 33 affecting a lift upon each of the pulleys 25 and consequently effecting a conjoint lifting upon the bank of belts 23 to move the same away from ground contact.

The retrieving means comprising the bank of belts 23 and the grabber bars 45 fixed to these belts is adapted to be driven along the cotton rows, with the retrieving means moving between two adjacent cotton rows. In many instances locks and bolls of cotton drop to the ground immediately beneath the cotton plants and along the cotton rows, and it is desirable therefore in such conditions that the retrieving means be provided with additional means for positioning such locks and bolls for engagement by the retrieving means. For this purpose it is preferred that the device be provided with pneumatic blast means spaced outwardly away from the retrieving means so as to overlie and be spaced beyond the plants along the crop row. Such pneumatic blast means may comprise, as here shown, a pair of air blast nozzles 71 connected with suitable conduits which are supported from frame 13, and which are connected to a suitable source of air blast carried upon the frame, such as the fan 73. The respective nozzles 71 are disposed on opposite sides of the retrieving means and are directed toward the retrieving means so that the effect of the air blast is to direct and move materials along the crop row toward the retrieving means for engagement thereby.

Rearwardly adjacent the retrieving means, the device may include cleaning and treating means for handling and delivering the scrap cotton retrieved by the retrieving means to a suitable container as basket 55. Thus in the embodiment shown there is a rotary doffer 75 which comprises a drum extending transversely of the scrapper means relatively closely adjacent to belt drum 21 and slightly rearward thereof. Projecting from doffer 75 are doffer bars 77, each of which is substantially transversely coextensive with the drum, and each of which includes in the embodiment shown a flexible rubber fiber strip wiper element 79. Doffer 75 is positioned so that upon rotation the wiper strip 79 contacts grabber bars 45 as they are moved about rear drum 21 and the doffer is effective to wipe from the grabber bars the locks and bolls of cotton that have been gathered thereby and to move the same rearwardly away from the belts 23. Preferably doffer drum 75 is rotatably driven in a direction opposite to the rotational drive of belt drum 21 in order to enhance the wiping and removing action of the doffer in connection with the rear end of belts 23.

Doffer 75 directs the cotton removed from belts 23 in an upward and rearward direction, the path of the material thus affected by the doffer being restrained within the unit as by a suitable shield 81 which may be composed of a series of substantially parallel bars which will inhibit the passage of any locks or bolls of cotton therebeyond while permitting the passage of trash and small materials not desired therethrough.

Such cotton as is wiped from the belts 23 by doffer 75 is, due to the rotational speed of the doffer, thrown away therfrom and into the zone of rotation, in the embodiment here shown, of a beater 83, which also comprises a drum-like member spanning across the cleaning and treating portion of the cotton scrapper means, and which includes a plurality of radially extending circumferentially spaced blades 85, which are preferably coextensive in length with the drum of the beater and are adapted to receive and effect a beating action upon the cotton locks discharged into the zone of the beater from the rotary doffer 75. The beater 83 is rotated in a direction similar to that of the rotation of doffer 75 and further induces the rearward and upward movement of the cotton that has been brought into the cleaning and treating section of the device from the retrieving means. Such material is cast against the upper shield 87, which also is a grid-like elements preferably comprising a series of substantially parallel bars against which the cotton locks are cast in order to discharge therefrom any trash that may have accumulated in the locks and any other materials which may have been travelling with the locks.

The bars of the shield are spaced so as substantially to prevent the passage therebetween of any of the cotton locks while permitting the passage therebetween of any trash, dirt, sticks and the like which may have been entrained with the cotton and may have been carried to that point for treatment. The cotton cast against shield 87 drops therefrom by gravity onto an upper saw drum 89, the teeth of which are forwardly curved, and the saw drum 89 is driven in a relatively forward direction in the preferred embodiment as shown. The teeth of saw drum 89 seize the cotton locks and carry the cotton, and any remaining trash forwardly and downwardly.

The material so moved by the upper saw drum is projected against a top grid bar 91 and additional grid bars 93, the additional grid bars being preferably formed as of angle members, and each of the grid bars spanning transversely from side to side of the cleaning and treating portion of the present device, so that they, in effect, provide an additional grid comprising transversely and horizontally disposed bars. The cotton is thrown against these horizontally disposed grid members by the action of the saw drum 89 and further cleaning of the cotton is effected by the discharge of loose trash which may be crushed in virtue of the centrifugal action of the saw drum throwing the cotton and its related materials against the grid bars and resulting in the passage of further cotton, which is cleaned in the embodiment shown by the action of a saw doffer 95 which induces the removal of the cotton locks from the saw drum and the discharge of the same upwardly toward a suction means for transportation to a suitable receptacle such as the basket 55.

Interposed therebetween in the present embodiment is a second saw drum 97 by which the cotton locks are further treated and delivered toward the discharge of the suction means which may be accomplished through an exhaust pipe 99 provided with suitable source of exhaust in order to transport the cotton introduced thereinto through the exhaust pipe for delivery into the basket 55.

In the embodiment shown the saw doffer 95 is surrounded by a shield of perforated material 101 and an additional retainer grid 103 is formed of substantially transversely extending bars spaced so as to retain the cotton locks thereabove while permitting the discharge therethrough and therebetween of any trash that has been released from the cotton locks by the treating means just described.

It will be understood that other means for treating and handling the cotton retrieved by the retrieving means may be employed without departing from the present invention, although it is preferred that the embodiment as set forth herein be employed in conjunction with the retrieving means.

It will be seen that the present device may be driven along the cotton rows with the retrieving means, primarily consisting of the bank of belts 23 together with the grabber bars 45 connected thereto, travelling between adjacent crop rows. As indicated, it is preferred that the pneumatic blast means be used in conjunction with the cotton retrieving means so as to be positioned beyond the respective cotton rows between which the retrieving means is being driven and to provide an air blast for directing and moving stray locks and bolls of bottom toward the path of the retrieving means.

As can readily be seen, each of the belts 23 and the associated grabber bars 45 effectively attack the material with which they come in contact. As the belt passes about the forward pulleys 25 the grabber bars are separated tangentially away from juxtaposition against the next adjacent grabber bar so as to provide a space for engaging with an object such as the cotton lock or boll which the device is designed to attack. After the lock of cotton has been attacked and the grabber bar moves beyond the pulley at the forward end, the grabber bar is moved tightly into or toward engagement with its next preceding grabber bar, effecting a sharp clamping upon the lock of cotton along the lower flight 43 of the belt.

As the belts 23 successively pass about drum 21 grabber bars 45 are again tangentially separated from the next preceding grabber bars so as to release the engagement with the retrieved cotton locks or bolls and to discharge the same from the belts 23 for delivery by the suction means to basket 55. It will be seen that the grabber bars 45 substantially overlap along the extent of the belts 23 and thus enhance the efficiency of the operation of the device.

It will be understood that while cleaning and treating means such as those described herein may be used with the retrieving means, in many circumstances these means may be eliminated and the retrieving means communicated substantially directly with the suction means for delivery of the discharged cotton locks to the basket 55. In other instances it may be desirable to provide a doffer, such as the doffer 75, to enhance discharge of the cotton locks from the belts 23 and to assist in the delivery of same to the suction means for delivery to the basket.

It further will be seen that in view of the independent mounting of the pulleys 25 about which the forward ends of the respective belts 23 are trained the retrieving means is enabled to conform to variations in contour of ground over which the device may be passed. It will be understood that the struts 27 constantly urge the pulleys 25 away from drum 21 in such manner as to maintain a tension upon the belts 23 and to prevent sagging in the flights of the belts. In addition, since the connection of the struts to the pivot 37 is disposed above the axial line connecting the center of the drum and the center of the pulleys, the pulleys are urged downwardly so as to move the belts and grabber bars toward ground contact, insuring a full opportunity for engagement with the cotton locks that are moved into the path of the retrieving means.

Thus it will be seen that a highly efficient means is provided for retrieving lost or dropped locks of cotton and bolls of cotton and of delivering the same to a suitable receptacle for future and further use.

I claim:

1. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars fixed to said belt, each said grabber bar including a spine connected to said belt, a set of prongs projecting away from said spine, said prongs of each said bar overlapping the spine of the next adjacent preceding grabber bar, said grabber bars lying in close overlapping contact along the lengths of the flights of said belt and projecting tangentially from said belt around the respective curved end portions of said belt, said prongs of each grabber bar being substantially flat and laterally spaced apart, the lateral spacing between adjacent said prongs being substantially equal in width to the width of a prong, said spacing providing for discharge of undesired material during use of said belt means.

2. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of sets of prongs connected to said belt, each set of prongs projecting longitudinally away from the connection to said belt, said prongs of each said set overlapping the next adjacent preceding set of prongs, said prongs lying in close overlapping contact along the lengths of the flights of said belt and projecting tangentially from said belt around the respective curved end portions of said belt, said prongs of each set being substantially flat and laterally spaced apart, the lateral spacing between adjacent said prongs being substantially equal in width to the width of a prong, said prong spacing providing for discharge of undesired material during use of said belt means.

3. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars fixed to said belt, each said grabber bar including a spine connected to said belt, a set of prongs projecting away from said spine, said prongs of each said bar overlapping the spine of the next adjacent preceding grabber bar, said grabber bars lying in close overlapping contact along the length of the flights of said belt and projecting tangentially from said belt around the respective curved end portions of said belt, said prongs of each grabber bar being substantially flat and laterally spaced apart, said prong spacing providing for discharge of undesired material during use of said belt means.

4. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of sets of prongs connected to said belt, each set of prongs projecting away from the connection to said belt, said prongs of each said set overlapping the next adjacent preceding set of prongs, said prongs lying in close overlapping contact along the lengths of the flights of said belt and projecting tangentially from said belt around the respective curved end portions of said belt, said prongs of each set being substantially flat and laterally spaced apart, said prong spacing providing for discharge of undesired material during use of said belt means.

5. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars fixed to said belt, each said grabber bar including a spine connected to said belt, a set of prongs projecting away from said spine, said prongs of each said bar overlapping the spine of the next adjacent preceding grabber bar, said grabber bars lying in close overlapping contact along the lengths of the flights of said belt and projecting tangentially from said belt around the respective curved end portions of said belt, said prongs of each grabber bar being laterally spaced apart, said prong spacing providing for discharge of undesired material during use of said belt means.

6. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of sets of prongs connected to said belt, each set of prongs projecting longitudinally away from the connection to said belt, said prongs of each said set overlapping the next adjacent preceding set of prongs, said prongs lying in close overlapping contact along the lengths of the flights of said belt and projecting tangentially from said belt around the respective curved end portions of said belt, said prongs of each set being laterally spaced apart, said prong spacing providing for discharge of undesired material during use of said belt means.

7. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars connected to said belt, each said grabber bar including a set of prongs projecting away from the connection of the bar to the belt, said prongs of each said bar overlapping the next adjacent preceding grabber bar, said grabber bars lying in close overlapping contact along the lengths of the flights of said belt and projecting tangentially from said belt around the respective curved end portions of said belt, said prongs of each grabber bar being laterally spaced apart, said prong spacing providing for discharge of undesired material during use of said belt means.

8. In a cotton scrapper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, spring loaded extensible struts, said pulleys carried by the forward ends of said struts, said struts being pivoted at their rearward ends intermediate said drum and said pulleys and resiliently urging said pulleys and the forward parts of said belts downwardly toward firm ground contact, a multiplicity of grabber bars fixed to each said belt, each grabber bar being a rigid member having a spine connected to its related belt, a set of prongs projecting away from said spine in a leading position relative to the direction of belt drive, the prongs of each grabber bar overlapping the spine of the next preceding grabber bar, said grabber bars being in close overlapping contact along the upper and lower flights of said belts between said drum and said pulleys, passage of said belts about said pulleys substantially tangentially projecting said grabber bars successively from said belts opening gaps between said grabber bars for engaging scrap cotton in the path thereof, said grabber bars returning toward said contact upon departure rearwardly from said pulleys grasping engaged scrap cotton, said grabber bars substantially tangentially separating during travel around said drum for releasing engaged scrap cotton, said prongs being laterally spaced apart for discharge of trash from said grabber bars, and means for conveying released scrap cotton to a container.

9. In a cotton scrapper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, means mounting said pulleys and resiliently urging said pulleys and the forward parts of said belts downwardly toward firm ground contact, a multiplicity of grabber bars fixed to each said belt, each grabber bar being a rigid member having a spine connected to its related belt, a set of prongs projecting away from said spine in a leading position relative to the direction of belt drive, the prongs of each grabber bar overlapping the spine of the next preceding grabber bar, said grabber bars being in close overlapping contact along the upper and lower flights of said belts between said drum and said pulleys, passage of said belts about said pulleys substantially tangentially projecting said grabber bars successively from said belts opening gaps between said grabber bars for engaging scrap cotton in the path thereof, said grabber bars returning toward said contact upon departure rearwardly from said pulleys grasping engaged scrap cotton, said grabber bars substantially tangentially separating during travel around said drum for releasing engaged scrap cotton, said prongs being laterally spaced apart for discharge of trash from said grabber bars, and means for conveying released scrap cotton to a container.

10. In a cotton scrapper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, means mounting said pulleys and resiliently urging said pulleys and the forward parts of said belts downwardly toward firm ground contact, a multiplicity of grabber bars fixed to each said belt, each grabber bar being a rigid member having a spine connected to its related belt, a set of prongs projecting away from said spine in a leading position relative to the direction of belt drive, the prongs of each grabber bar overlapping the spine of the next preceding grabber bar, said grabber bars being in close overlapping contact along the upper and lower flights of said belts between said drum and said pulleys, passage of said belts about said pulleys subtantially tangentially projecting said grabber bars successively from said belts opening gaps between said grabber bars for engaging scrap cotton in the path thereof, said grabber bars returning toward said contact upon departure rearwardly frim said pulleys grasping engaged scrap cotton, said grabber bars substantially tangentially separating during travel around said drum for releasing engaged scrap cotton, and means for conveying released scrap cotton to a container.

11. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum means and driven thereby and extending forwardly and downwardly therefrom, a like plurality of pulleys spaced forwardly from and below said drum means, said belts being respectively trained about said pulleys, means mounting said pulleys and resiliently urging said pulleys and the forward parts of said belts downwardly toward firm ground contact, a multiplicity of sets of prongs connected to each said belt and projecting away from said connection in a leading position relative to the direction of belt drive, the prongs of each set of prongs overlapping the next preceding set of prongs, said set of prongs being in close overlapping contact along the upper and lower flights of said belts between said drum means and said pulleys, passage of said belts about said pulleys substantially tangentially projecting said sets of prongs successively from said belts opening gaps between said sets of prongs for engaging scrap cotton in the path thereof, said sets of prongs returning toward said contact upon departure rearwardly from said pulleys grasping engaged scrap cotton, said sets of prongs substantially tangentially separating during travel around said drum means for releasing engaged scrap cotton.

12. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum means and driven thereby and extending forwardly and downwardly therefrom, a like plurality of pulleys spaced forwardly from and below said drum means, said belts being respectively trained about said pulleys, spring loaded extensible struts, said pulleys carried by the forward ends of said struts, said struts being pivoted at their rearward ends intermediate said drum means and said pulleys and resiliently urging said pulleys and the forward parts of said belts downwardly toward firm ground contact, a multiplicity of sets of prongs connected to each said belt and projecting away from said connection in a leading position relative to the direction of belt drive, the prongs of each set of prongs overlapping the next preceding set of prongs, said sets of prongs being in close overlapping contact along the upper and lower flights of said belts between said drum means and said pulleys, passage of said belts about said pulleys substantially tangentially projecting said sets of prongs successively from said belts opening gaps between said sets of prongs for engaging scrap cotton in the path thereof, said sets of prongs returning toward said contact upon departure rearwardly from said pulleys grasping engaged scrap cotton, said sets of prongs substantially tangentially separating during travel around said drum means for releasing engaged scrap cotton.

13. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum and driven thereby and extending forwardly and downwardly therefrom, a like plurality of pulleys spaced forwardly from and below said drum means, said belts being respectively trained about said pulleys, spring loaded extensible struts, said pulleys carried by the forward ends of said struts, said struts being pivoted at their rearward ends intermediate said drum means and said pulleys and resiliently urging said pulleys and the forward parts of said belts downwardly toward firm ground contact, a multiplicity of sets of prongs connected to each said belt and projecting away from said connection in a leading position relative to the direction of belt drive, the prongs of each set of prongs overlapping the next preceding set of prongs, said set of prongs being in close overlapping contact along the upper and lower flights of said belts between said drum means and said pulleys, passage of said belts about said pulleys substantially tangentially projecting said sets of prongs successively from said belts opening gaps between said sets of prongs for engaging scrap cotton in the path thereof, said sets of prongs returning toward said contact upon departure rearwardly from said pulleys grasping engaged scrap cotton, said sets of prongs substantially tangentially separating during travel around said drum means for releasing engaged scrap cotton, and means for conveying released scrap cotton to a container.

14. In a cotton scraper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, spring loaded extensible struts, said pulleys carried by the forward ends of said struts, said struts being pivoted at their rearward ends intermediate said drum and said pulleys and resiliently urging said pulleys and the forward parts of said belts downwardly toward firm ground contact, a multiplicity of grabber bars fixed to each said belt, each grabber bar being a rigid member having a spine connected to its related belt, a set of prongs projecting away from said spine in a leading position relative to the direction of belt drive, said grabber bars being positioned in close relation to the belts along the upper and lower flights of said belts between said drum and said pulleys, passage of said belts about said pulleys substantially tangentially projecting said grabber bars successively from said belts opening gaps between said grabber bars and said belts for engaging scrap cotton in the path thereof, said grabber bars returning toward said close relation to said belts upon departure rearwardly from said pulleys grasping engaged scrap cotton, said grabber bars substantially tangentially projecting from said belts during travel around said drum for releasing engaged scrap cotton, said prongs being laterally spaced apart for discharge of trash from said grabber bars, and means for conveying released scrap cotton to a container.

15. In a cotton scraper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys space forwardly from and below said drum, said belts being respectively trained about said pulleys, means mounting said pulleys and resiliently urging said pulleys and the forward parts of said belts downwardly toward firm ground contact, a multiplicity of grabber bars fixed to each said belt, each grabber bar being a rigid member having a spine connected to its related belt, a set of prongs projecting away from said spine in a leading position relative to the direction of belt drive, said grabber bars being positioned in close relation to the belts along the upper and lower flights of said belts between said drum and said pulleys, passage of said belts about said pulleys substantially tangentially projecting said grabber bars successively from said belts opening gaps between said grabber bars and said belts for engaging scrap cotton in the path thereof, said grabber bars returning toward said close relation to said belts upon departure rearwardly from said pulleys grasping engaged scrap cotton, said grabber bars substantially tangentially projecting from said belts during travel around said drum for releasing engaged scrap cotton, said prongs being laterally spaced apart for discharge of trash from said grabber bars, and means for conveying released scrap cotton to a container.

16. In a cotton scrapper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, means mounting said pulleys and resiliently urging said pulleys and the forward parts of said belts downwardly toward firm ground contact, a multiplicity of grabber bars fixed to each said belt, each grabber bar being a rigid member having a spine connected to its related belt, a set of prongs projecting away from said spine in a leading position relative to the direction of belt drive, said grabber bars being positioned in close relation to the belts along the upper and lower flights of said belts between said drum and said pulleys, passage of said belts about said pulleys substantially tangentially projecting said grabber bars successively from said belts opening gaps between said grabber bars and said belts for engaging scrap cotton in the path thereof, said grabber bars returning toward said close relation to said belts upon departure rearwardly from said pulleys grasping engaged scrap cotton, said grabber bars substantially tangentially projecting from said belts during travel around said drum for releasing engaged scrap cotton, and means for conveying released scrap cotton to a container.

17. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum means and driven thereby and extending forwardly and downwardly therefrom, a like plurality of pulleys spaced forwardly from and below said drum means, said belts being respectively trained about said pulleys, means mounting said pulleys and resiliently urging said pulleys and the forward parts of said belts downwardly toward firm ground contact, a multiplicity of sets of prongs connected to each said belt and projecting away from said connection in a leading position relative to the direction of belt drive, said sets of prongs being positioned in close relation to the belts along the upper and lower flights of said belts between said drum means and said pulleys, passage of said belts about said pulleys substantially tangentially projecting said sets of prongs successively from said belts opening gaps between said sets of prongs and said belts for engaging scrap cotton in the path thereof, said sets of prongs returning toward said close relation to said belts upon departure rearwardly from said pulleys grasping engaged scrap cotton, said sets of prongs substantially tangentially projecting from said belts during travel around said drum means for releasing engaged scrap cotton.

18. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum means and driven thereby and extending forwardly and downwardly therefrom, a like plurality of pulleys spaced forwardly from and below said drum means, said belts being respectively trained about said pulleys, spring loaded extensible struts, said pulleys carried by the forward ends of said struts, said struts being pivoted at their rearward ends intermediate said drum means and said pulleys and resiliently urging said pulleys and the forward parts of said belts downwardly toward firm ground contact, a multiplicity of sets of prongs connected to each said belt, and projecting away from said connection in a leading position relative to the direction of belt drive, said sets of prongs being positioned in close relation to the belts along the upper and lower flights of said belts between said drum means and said pulleys, passage of said belts about said pulleys substantially tangentially projecting said sets of prongs successively from said belts opening gaps between said sets of prongs and said belts for engaging scrap cotton in the path thereof, said sets of prongs returning toward said close relation to said belts upon departure rearwardly from said pulleys grasping engaged scrap cotton, said sets of prongs substantially tangentially projecting from said belts during travel around said drum means for releasing engaged scrap cotton.

19. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum and driven thereby and extending forwardly and downwardly therefrom, a like plurality of pulleys spaced forwardly from and below said drum means, said belts being respectively trained about said pulleys, spring loaded extensible struts, said pulleys carried by the forward ends of said struts, said struts being pivoted at their rearward ends intermediate said drum means and said pulleys and resiliently urging said pulleys and the forward parts of said belts downwardly toward firm ground contact, a multiplicity of sets of prongs connected to each said belt and projecting away from said connection in a leading position relative to the direction of belt drive, said sets of prongs being positioned in close relation to the belts along the upper and lower flights of said belts between said drum means and said pulleys, passage of said belts about said pulleys substantially tangentially projecting said sets of prongs successively from said belts opening gaps between said sets of prongs and said belts for engaging scrap cotton in the path thereof, said sets of prongs returning toward said close relation to said belts upon departure rearwardly from said pulleys grasping engaged scrap cotton, said sets of prongs substantially tangentially projecting from said belts during travel around said drum means for releasing engaged scrap cotton and means for conveying released scrap cotton to a container.

20. In a cotton scrapper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, spring loaded extensible struts, said pulleys carried by the forward ends of said struts, said struts being pivoted at their rearward ends intermediate said drum and said pulleys and resiliently urging said pulleys and the forward parts of said belts downwardly toward firm ground contact, a multiplicity of grabber bars fixed to each said belt, said grabber bars being positioned in close relation to the belts along the upper and lower flights of said belts between said drum and said pulleys, passage of said belts about said pulleys substantially tangentially projecting said grabber bars successively from said belts opening gaps between said grabber bars and said belts for engaging scrap cotton in the path thereof, said grabber bars returning toward said close relation to said belts upon departure rearwardly from said pulleys grasping engaged scrap cotton, said grabber bars substantially tangentially projecting from said belts during travel around said drum for releasing engaged scrap cotton, and means for conveying released scrap cotton to a container.

21. In a cotton scrapper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, means mounting said pulleys and resiliently urging said pulleys and the forward parts of said belts downwardly toward firm ground contact, a multiplicity of grabber bars fixed to each said belt, said grabber bars being positioned in close relation to the belts along the upper and lower flights of said belts between said drum and said pulleys, passage of said belts about said pulleys substantially tangentially projecting said grabber bars successively from said belts opening gaps between said grabber bars and said belts for engaging scrap cotton in the path thereof, said grabber bars returning toward said close relation to said belts upon departure rearwardly from said pulleys grasping engaged scrap cotton, said grabber bars substantially tangentially projecting from said belts during travel around said drum for releasing engaged scrap cotton, and means for conveying released scrap cotton to a container.

22. In a cotton scrapper having a frame, means for retrieving scrap cotton from ground level comprising a bank of a plurality of independent endless flexible belts positioned side by side in closely adjacent substantially parallel relationship, a drum rotatably mounted on said frame, means for driving said drum, said bank of belts being trained about said drum and driven thereby and extending forwardly and downwardly therefrom, a like plurality of pulleys spaced forwardly from and below said drum, said belts being respectively trained about said pulleys, means mounting said pulleys and resiliently urging said pulleys and the forward parts of said belts downwardly toward firm ground contact, a multiplicity of grabber bars fixed to each said belt, said grabber bars being positioned in close relation to the belts along the upper and lower flights of said belts between said drum and said pulleys, passage of said belts about said pulleys substantially tangentially projecting said grabber bars successively from said belts opening gaps between said grabber bars and said belts for engaging scrap cotton in the path thereof, said grabber bars returning toward said close relation to said belts upon departure rearwardly from said pulleys grasping engaged scrap cotton, said grabber bars substantially tangentially projecting from said belts during travel around said drum for releasing engaged scrap cotton, and means for conveying released scrap cotton to a container.

23. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum means and driven thereby and extending forwardly and downwardly therefrom, a like plurality of pulleys spaced forwardly from and below said drum means, said belts being respectively trained about said pulleys, means mounting said pulleys and resiliently urging said pulleys and the forward parts of said belts downwardly toward firm ground contact, a multiplicity of sets of prongs connected to each said belt, said sets of prongs being positioned in close relation to the belts along the upper and lower flights of said belts between said drum means and said pulleys, passage of said belts about said pulleys substantially tangentially projecting said sets of prongs successively from said belts opening gaps between said sets of prongs and said belts for engaging scrap cotton in the path thereof, said sets of prongs returning toward said close relation to said belts upon departure rearwardly from said pulleys grasping engaged scrap cotton, said sets of prongs substantially tangentially projecting from said belts during travel around said drum means for releasing engaged scrap cotton.

24. In a cotton scrapper having a frame, means for retrieving scrap cotton from ground level comprising a bank of a pluralty of independent endless flexible belts positioned side by side in closely adjacent substantially parallel relationship, drum means rotatably mounted on said frame, means for driving said drum means, said bank of belts being trained about said drum means and driven thereby and extending forwardly and downwardly therefrom, a like plurality of pulleys spaced forwardly from and below said drum means, said belts being respectively trained about said pulleys, spring loaded extensible struts, said pulleys carried by the forward ends of said struts, said struts being pivoted at their rearward ends intermediate said drum means and said pulleys and resiliently urging said pulleys and the forward parts of said belts downwardly toward firm ground contact, a multiplicity of sets of prongs connected to each said belt, said sets of prongs being positioned in close relation to the belts along the upper and lower flights of said belts between said drum means and said pulleys, passage of said belts about said pulleys substantially tangentially projecting said sets of prongs successively from said belts opening gaps between said sets of prongs and said belts for engaging scrap cotton in the path thereof, said sets of prongs returning toward said close relation to said belts upon departure rearwardly from said pulleys grasping engaged scrap cotton, said sets of prongs substantially tangentially projecting from said belts during travel around said drum means for releasing engaged scrap cotton.

25. In a cotton scrapper having a frame, means for retrieving scrap cotton from ground level comprising a bank of a plurality of independent endless flexible belts positioned side by side in closely adjacent substantially parallel relationship, drum means rotatably mounted on said frame, means for driving said drum means, said bank of belts being trained about said drum and driven thereby and extending forwardly and downwardly therefrom, a like plurality of pulleys spaced forwardly from and below said drum means, said belts being respectively trained about said pulleys, spring loaded extensible struts, said pulleys carried by the forward ends of said struts, said struts being pivoted at their rearward ends intermediate said drum means and said pulleys and resiliently urging said pulleys and the forward parts of said belts downwardly toward firm ground contact, a multiplicity of sets of prongs connected to each said belt, said sets of prongs being positioned in close relation to the belts along the upper and lower flights of said belts between said drum means and said pulleys, passage of said belts about said pulleys substantially tangentially projecting said sets of prongs successively from said belts opening gaps between said sets of prongs and said belts for engaging scrap cotton in the path thereof, said sets of prongs returning toward said close relation to said belts upon departure rearwardly from said pulleys grasping engaged scrap cotton, said sets of prongs substantially tangentially projecting from said belts during travel around said drum means for releasing engaged scrap cotton, and means for conveying released scrap cotton to a container.

26. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars fixed to said belt, each said grabber bar including a spine connected to said belt, a set of prongs projecting away from said spine, said grabber bars lying in close contact with the belt along the lengths of the flights of said belt and projecting tangentially from said belt around the respective curved end portions of said belt, said prongs of each grabber bar being substantially flat and laterally spaced apart, the lateral spacing between adjacent said prongs being substantially equal in width to the width of a prong, said spacing providing for discharge of undesired material during use of said belt means.

27. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of sets of prongs connected to said belt, each set of prongs projecting longitudinally away from the connection to said belt, said prongs lying in close contact with said belt along the lengths of the flights of said belt and projecting tangentially from said belt around the respective curved end portions of said belt, said prongs of each set being substantially flat and laterally spaced apart, the lateral spacing between adjacent said prongs being substantially equal in width to the width of a prong, said prong spacing providing for discharge of undesired material during use of said belt means.

28. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars fixed to said belt, each said grabber bar including a spine connected to said belt, a set of prongs projecting away from said spine, said grabber bars lying in close contact with the belt along the length of the flights of said belt and projecting tangentially from said belt around the respective curved end portions of said belt, said prongs of each grabber bar being substantially flat and laterally spaced apart, said prong spacing providing for discharge of undesired material during use of said belt means.

29. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of sets of prongs connected to said belt, each set of prongs projecting away from the connection to said belt, said prongs lying in close contact with the belt along the lengths of the flights of said belt and projecting tangentially from said belt around the respective curved end portions of said belt, said prongs of each set being substantially flat and laterally spaced apart, said prong spacing providing for discharge of undesired material during use of said belt means.

30. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars fixed to said belt, each said grabber bar including a spine connected to said belt, a set of prongs projecting away from said spine, said grabber bars lying in close contact with the belt along the lengths of the flights of said belt and projecting tangentially from said belt around the respective curved end portions of said belt, said prongs of each grabber bar being laterally spaced apart, said prong spacing providing for discharge of undesired material during use of said belt means.

31. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of sets of prongs connected to said belt, each set of prongs projecting longitudinally away from the connection to said belt, said prongs lying in close contact with the belt along the lengths of the flights of said belt and projecting tangentially from said belt around the respective curved end portions of said belt, said prongs of each set being laterally spaced apart, said prong spacing providing for discharge of undesired material during use of said belt means.

32. In a cotton scrapper, belt means for retrieving scrap cotton, comprising a flexible, endless belt, means for supporting and driving said belt means including resilient means pivoted at one end intermediate the curved end portions of said belt means and connected at its other end with one curved end portion of said belt means, said resilient means urging said one end portion of the belt means resiliently downwardly toward ground contact, a plurality of grabber bars connected to said belt, each said grabber bar including a set of prongs projecting away from the connection of the bar to the belt, said grabber bars lying in close contact with the belt along the lengths of the flights of said belt and projecting tangentially from said belt around the respective curved end portions of said belt, said prongs of each grabber bar being laterally spaced apart, said prong spacing providing for discharge of undesired material during use of said belt means.

References Cited in the file of this patent

UNITED STATES PATENTS

| | | |
|---|---|---|
| 238,734 | Underwood | Mar. 8, 1881 |
| 430,372 | Baker | June 17, 1890 |
| 865,748 | Auble | Sept. 10, 1907 |
| 1,354,493 | Kenneck | Oct. 5, 1920 |
| 1,438,566 | Wiggins | Dec. 12, 1922 |
| 1,756,278 | Buckner | Apr. 29, 1930 |
| 2,670,584 | Rood, et al. | Mar. 2, 1954 |
| 2,928,224 | Powell | Mar. 15, 1960 |